US011006320B2

(12) United States Patent
Bergqvist et al.

(10) Patent No.: US 11,006,320 B2
(45) Date of Patent: May 11, 2021

(54) WIRELESS DEVICE, A RADIO NETWORK NODE, A NETWORK NODE, AND METHODS THEREIN FOR LOAD BALANCING IN A WIRELESS COMMUNICATIONS NETWORK

(71) Applicant: Telefonaktiebolaget L M Ericsson (publ), Stockholm (SE)

(72) Inventors: Jens Bergqvist, Linköping (SE); Olof Liberg, Stockholm (SE); Paul Schliwa-Bertling, Ljungsbro (SE); Mårten Sundberg, Årsta (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 800 days.

(21) Appl. No.: 14/910,166

(22) PCT Filed: Jan. 15, 2016

(86) PCT No.: PCT/SE2016/050020
§ 371 (c)(1),
(2) Date: Feb. 4, 2016

(87) PCT Pub. No.: WO2016/126183
PCT Pub. Date: Aug. 11, 2016

(65) Prior Publication Data
US 2016/0373966 A1    Dec. 22, 2016

Related U.S. Application Data

(60) Provisional application No. 62/111,826, filed on Feb. 4, 2015.

(51) Int. Cl.
*H04W 28/08*    (2009.01)
*H04W 24/08*    (2009.01)
(Continued)

(52) U.S. Cl.
CPC ........ *H04W 28/085* (2013.01); *H04W 24/08* (2013.01); *H04W 68/005* (2013.01);
(Continued)

(58) Field of Classification Search
CPC ............. H04W 28/085; H04W 68/005; H04W 72/0406; H04W 72/10; H04W 72/042
(Continued)

(56) References Cited

U.S. PATENT DOCUMENTS

2013/0040598 A1    2/2013   Kashiwase
2013/0294319 A1*   11/2013  Haapaniemi ........ H04W 72/121
                                                     370/312
(Continued)

FOREIGN PATENT DOCUMENTS

CN    103200615 A    7/2013
CN    103327531 A    9/2013
(Continued)

OTHER PUBLICATIONS

3GPP, "3rd Generation Partnership Project; Technical Specification Group GSM/EDGE Radio Access Network; Cellular system support for ultra-low complexity and low throughput Internet of Things (CIoT) (Release 13)", 3GPP TR 45.820 V13.0.0 (Aug. 2015), Aug. 2015, 1-495.
(Continued)

*Primary Examiner* — Chi Tang P Cheng
(74) *Attorney, Agent, or Firm* — Murphy, Bilak & Homiller, PLLC

(57) ABSTRACT

A Radio Network Node, RNN, (106) and a method therein for load balancing in a wireless communications network (100). The RNN is configured to communicate with a wireless device (108) supporting both normal coverage and extended coverage. The RNN and the wireless device are operating in the wireless communications network.
(Continued)

The RNN determines an indication informing the wireless device that it, when in normal coverage, is to monitor one of a downlink legacy resource and an extended coverage resource for information and/or is to use one of an uplink legacy resource and an extended coverage resource when accessing the wireless communications network.

Further, the RNN transmits the indication to the wireless device.

44 Claims, 4 Drawing Sheets

(51) Int. Cl.
    *H04W 68/00*     (2009.01)
    *H04W 72/04*     (2009.01)
    *H04W 72/10*     (2009.01)

(52) U.S. Cl.
    CPC ....... *H04W 72/0406* (2013.01); *H04W 72/10* (2013.01); *H04W 72/042* (2013.01)

(58) Field of Classification Search
    USPC .......................................................... 370/235
    See application file for complete search history.

(56) References Cited

U.S. PATENT DOCUMENTS

2014/0370895 A1* 12/2014 Pandey ................. H04W 28/08 455/436
2017/0142718 A1* 5/2017 Gong ................ H04W 72/0446

FOREIGN PATENT DOCUMENTS

| CN | 104010345 A | 8/2014 |
|---|---|---|
| EP | 2781123 A1 | 9/2014 |
| EP | 2829124 A2 | 1/2015 |
| RU | 2504921 C2 | 1/2014 |
| WO | 2013072271 A1 | 5/2013 |
| WO | 2013134951 A1 | 9/2013 |
| WO | 2013142532 A2 | 9/2013 |

OTHER PUBLICATIONS

3GPP, "3rd Generation Partnership Project; Technical Specification Group GSM/EDGE Radio Access Network; General Packet Radio Service (GPRS); Overall description of the GPRS radio interface; Stage 2 (Release 12)", 3GPP TS 43.064 V12.2.0 (May 2014), May 2014, 1-106.

Unknown, Author, "EC-GSM—Mapping of logical channels onto physical channels", Ericsson, 3GPP TSG GERAN Ad HOC#1 on FS IoT LC, Tdoc GPC150055, Agenda item 1.4.3.1, Sofia Antipolis, France, Feb. 2-5, 2015, 1-9.

Unknown, Author, "Extended Coverage for GSM, Realizing extended coverage through Coverage Classes", Ericsson LM, 3GPP TSG GERAN1 Adhoc#1 on FS IoT LC, Tdoc GPC150065, Agenda item 1.4.3.1, Sophia Antipolis, France, Feb. 2-5, 2015, 1-7.

Unknown, Author, "New Study Item on Cellular System Support for Ultra Low Complexity and Low Throughput Internet of Things", Vodafone Group Plc., 3GPP TSG-GERAN Meeting #62, GP-140421, Valencia, Spain, May 26-30, 2014, 1-6.

Unknown, Author, "Pseudo CR 45.820—EC-GSM—Concept description", Ericsson LM, 3GPP TSG GERAN Ad Hoc #1 on Cellular IoT, AHG1-150063, Agenda item 1.4.3.1, 2.7, Sofia Antipolis, Feb. 2-5, 2015, 1-28.

3GPP, "3rd Generation Partnership Project; Technical Specification Group GSM/EDGE Radio Access Network; Cellular System Support for Ultra Low Complexity and Low Throughput Internet of Things; (Release 13)", 3GPP TR 45.820 V0.3.0, Mar. 2015, 1-54.

* cited by examiner

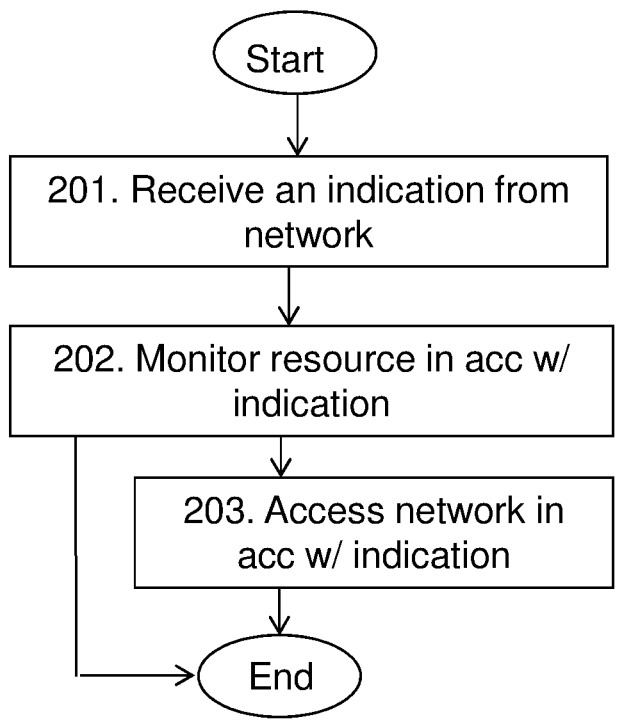
Figure 2 Method in device 108
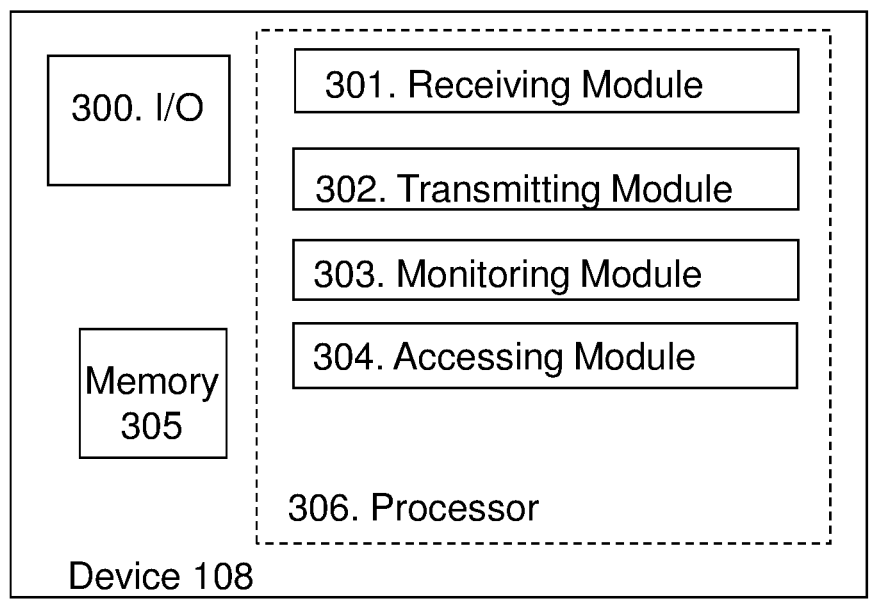
Figure 3

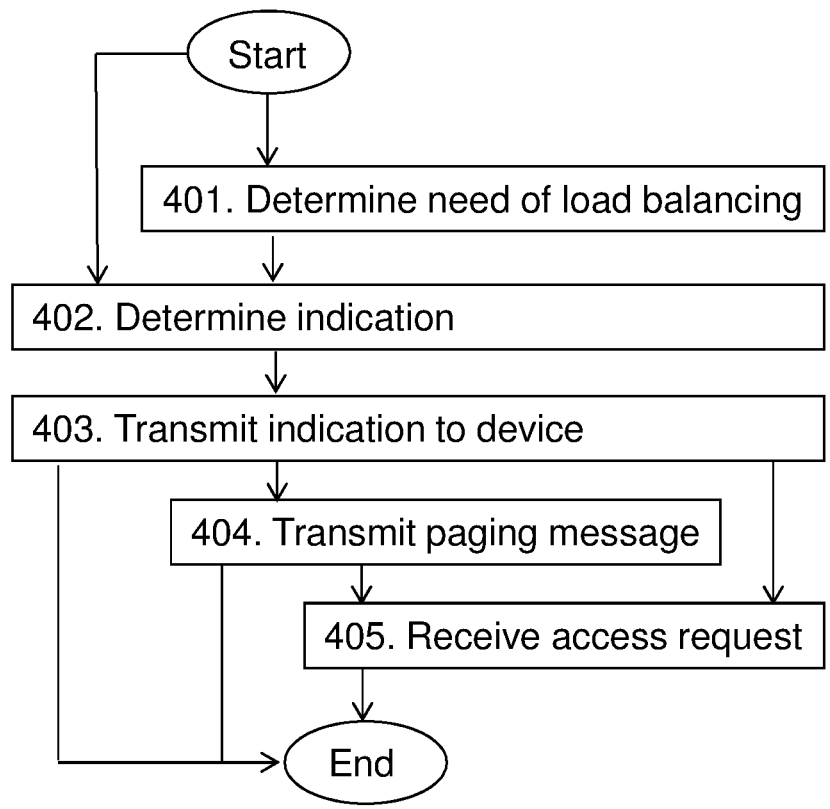
Figure 4 Method in Radio Network Node (RNN) 106
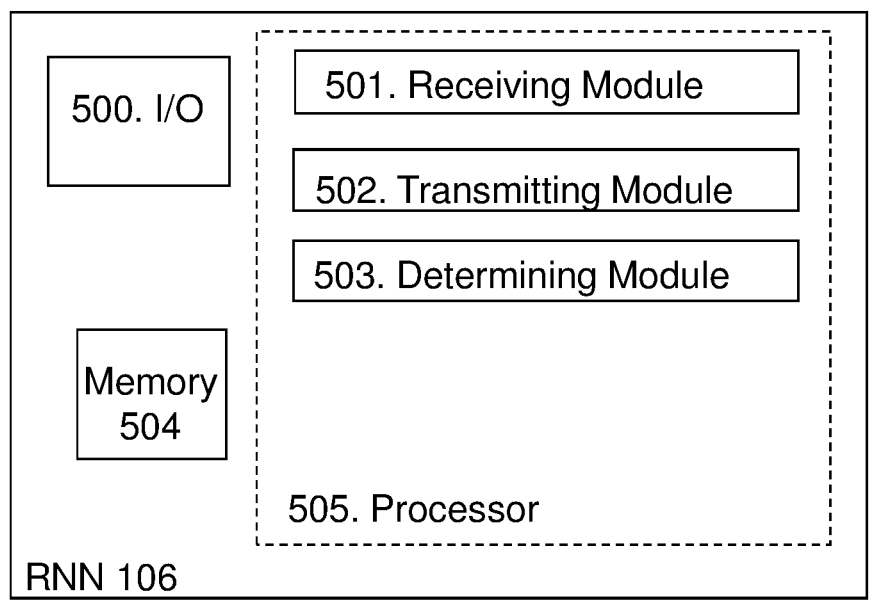
Figure 5

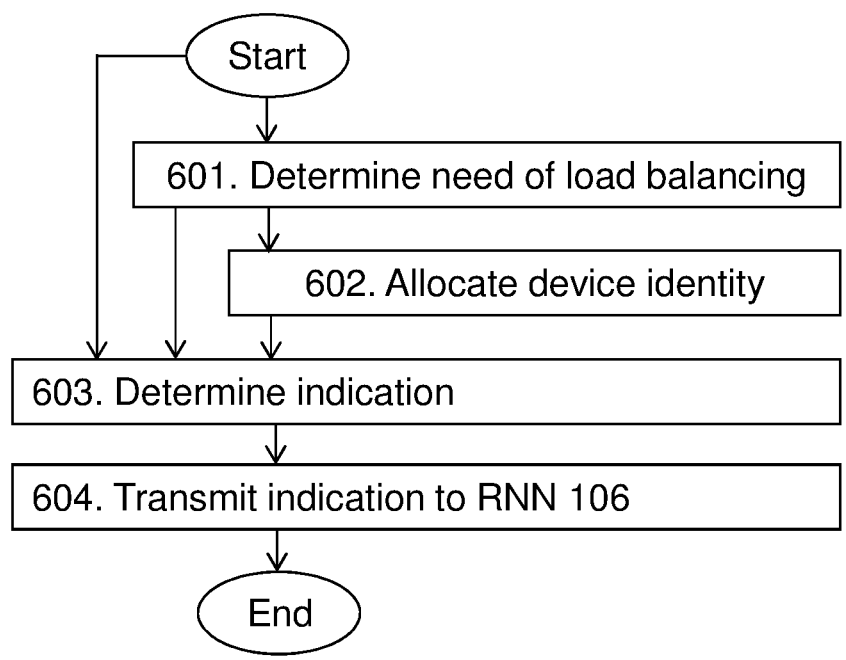
Figure 6 Method in Network Node (NN) 104
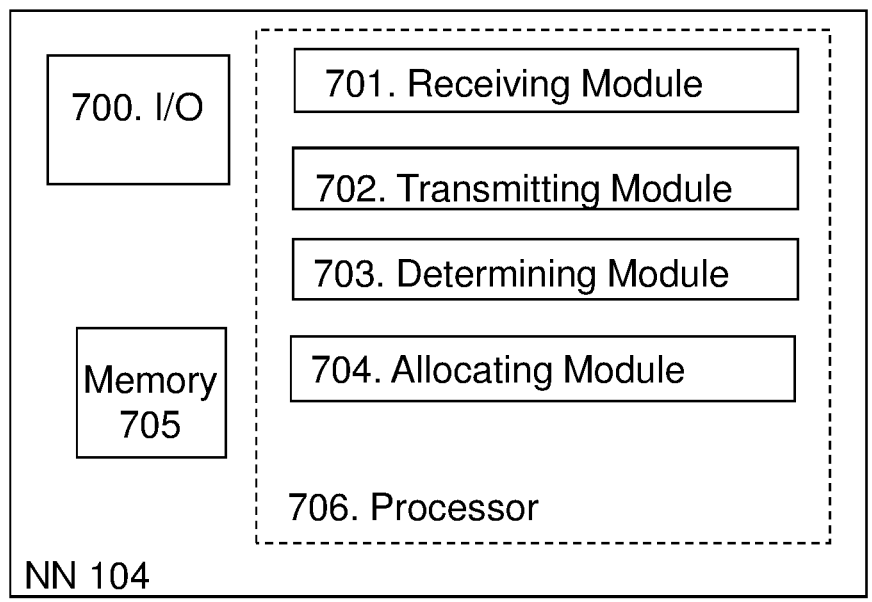
Figure 7

WIRELESS DEVICE, A RADIO NETWORK NODE, A NETWORK NODE, AND METHODS THEREIN FOR LOAD BALANCING IN A WIRELESS COMMUNICATIONS NETWORK

TECHNICAL FIELD

Embodiments herein relate generally to a wireless device, a radio network node, a network node, and to methods therein. Especially, embodiments here relate to load balancing in a wireless communications network.

BACKGROUND

Communication devices such as terminals are also known as e.g. User Equipment (UE), mobile terminals, stations (STAs), wireless devices, wireless terminals and/or Mobile Stations (MS). Terminals are enabled to communicate wirelessly in a cellular communications network or wireless communication system, sometimes also referred to as a cellular radio system or cellular networks. The communication may be performed e.g. between two terminals, between a terminal and a regular telephone and/or between a terminal and a server via a Radio Access Network (RAN) and possibly one or more core networks, comprised within the cellular communications network.

Terminals may further be referred to as mobile telephones, cellular telephones, laptops, or surf plates with wireless capability, just to mention some further examples. The terminals in the present context may be, for example, portable, pocket-storable, hand-held, computer-comprised, or vehicle-mounted mobile devices, enabled to communicate voice and/or data, via the RAN, with another entity, such as another terminal or a server.

The cellular communications network covers a geographical area which is divided into cell areas, wherein each cell area being served by an access node such as a base station, e.g. a Radio Base Station (RBS), which sometimes may be referred to as e.g. "eNB", "eNodeB", "NodeB", "B node", or Base Transceiver Station (BTS), depending on the technology and terminology used. The base stations may be of different classes such as e.g. macro eNodeB, home eNodeB, micro eNodeB or pico base station, based on transmission power, functional capabilities and thereby also cell size. A cell is the geographical area where radio coverage is provided by the base station at a base station site. One base station, situated on the base station site, may serve one or several cells. Further, each base station may support one or several communication technologies. The base stations communicate over the air interface operating on radio frequencies with the terminals within range of the base stations. In the context of this disclosure, the expression Downlink (DL) is used for the transmission path from the base station to the mobile station. The expression Uplink (UL) is used for the transmission path in the opposite direction i.e. from the mobile station to the base station.

In 3rd Generation Partnership Project (3GPP) Long Term Evolution (LTE), base stations, which may be referred to as eNodeBs or even eNBs, may be directly connected to one or more core networks.

3GPP LTE radio access standard has been written in order to support high bitrates and low latency both for uplink and downlink traffic. All data transmission is in LTE controlled by the radio base station.

Work is currently ongoing within 3GPP to specify a cellular radio access technology dedicated to cater for the so called Internet of Things (IoT) market. 3GPP Technical Specification Group (TSG) GSM EDGE Radio Access Network (GERAN) is working on this (see e.g. 3GPP TR 45.820 v13.0.0), but similar work is also ongoing in the 3GPP TSG Radio Access Network (RAN) for both Wideband Code Division Multiple Access (WCDMA) and LTE.

One important objective is to handle a vast number of wireless devices, e.g. Machine Type of Communication (MTC) devices, that might be situated in areas requiring extreme radio coverage. Examples of MTC devices are electricity meters, tracking devices and sensors in the automation industry. Further, by the expression "extreme radio coverage" when used herein is meant areas, e.g. coverage areas, with very poor radio coverage, not accessible with legacy radio network systems, such as GSM. An example of such an area may be an apartment basement.

One solution about to be standardized is Extended Coverage—EGPRS (EC-EGPRS) (see 3GPP TR 45.820 v13.0.0 for details, but note that EC-EGPRS in this TR is known as EC-GSM). In the EC-EGPRS solution, extended coverage is achieved via a repetition based transmission scheme.

Depending on the device coverage, e.g. the coverage area for the wireless device, different number of repetitions may be used to achieve the desirable performance for a packet transfer. Different Coverage Classes are therefore defined. By the expression "device coverage" when used in this disclosure is meant the radio coverage of the device. A Coverage Class of a wireless device indicates what radio coverage the device is experiencing and thus how many blind repetitions that would be needed to reach the device. 3GPP TS 43.064 v12.2.0 defines the concept of Blind physical layer transmissions, which may serve as a description for the term blind repetitions used within the context of this invention disclosure. Wireless devices that are within coverage that is in parity with what is supported by legacy GPRS radio network systems are considered to be in normal coverage.

By the expression "extended coverage" when used in this disclosure is meant a coverage wherein operation at a path loss or radio coverage range exceeding the coverage range earlier supported by 3GPP cellular networks, such as GSM, is supported. To cater for wireless devices in extended coverage, the EC-GSM defines a new overall frame mapping for the broadcast, synchronization and common control channels, comprising the Extended Coverage Synchronization Channel (EC-SCH) which is applicable in downlink (DL) only, Extended Coverage Broadcast Channel (EC-BCCH) which is applicable in DL only, and the Extended Coverage Common Control Channel (EC-CCCH) which is applicable both in uplink and downlink.

The EC-SCH, EC-BCCH and EC-CCCH are proposed to be mapped on Timeslot 1 (TS1) of the BCCH carrier, as it requires a frame mapping compatible with the envisioned coverage, and as such needs to be to distinguished from ISO of the BCCH carrier where the legacy SCH, BCCH and CCCH are mapped.

In the downlink, the EC broadcast channels will be used by the network to transmit, for example, System Information Broadcast (SIB) messages over the EC-BCCH, paging messages and access grant messages to wireless devices via the EC-CCCH DL, e.g. the Extended Coverage Paging Channel (EC-PCH) and the Extended Coverage Access Grant Channel (EC-AGCH), respectively. The uplink is dedicated to wireless devices transmitting access requests over the EC-CCCH UL, e.g. the Extended Coverage Random Access Channel (EC-RACH).

It is expected that most of the wireless devices in a radio network system will experience normal coverage, where the legacy GPRS system CCCH on ISO is available.

A drawback with the described solution where TS1 is dedicated to the EC-EGPRS is that a resource segregation is introduced between ISO used for the GSM/EDGE and TS1 used for the EC-EGPRS. A scenario where the network experiences high random access load in the EC-EGPRS, but low random access load in the GSM/EDGE will then lead to the TS1 UL being heavily loaded while the ISO on the UL will be under-utilized.

Further, the random access channel is a collision based channel meaning that wireless devices can access the channel at their own discretion. In addition, the EC-EGPRS wireless devices in different coverage areas, being of different coverage classes, will access the network at significantly different received signal levels at the BTS. In case a strong Access Burst (AB) from a first wireless device close to the BTS collides with a weak AB from a second wireless device being far from the BTS then the second wireless device far from the BTS will likely fail to access the network. A further drawback with the described design in the EC-EGPRS is hence that it will be challenging for wireless devices in extended coverage to access the network, due to the multiplexing on the EC-RACH with wireless devices in normal coverage.

SUMMARY

An object of embodiments herein is to address at least some of the above-mentioned drawbacks among others and to improve the performance in a communications network.

According to one aspect of embodiments herein, a method is performed by a radio network node, e.g. a radio base station, for load balancing in a wireless communications network. The radio network node is configured to communicate with a wireless device supporting both normal and extended coverage. The radio network node and the wireless device are operating in a communications network.

The radio network node determines an indication informing the wireless device that it, when in normal coverage, is to monitor one of a downlink legacy resource and an extended coverage resource for information and/or is to use one of an uplink legacy resource and an extended coverage resource when accessing the wireless communications network.

The radio network node transmits the indication to the wireless device.

According to another aspect of embodiments herein, a radio network node, e.g. a radio base station, for load balancing in a wireless communications network is provided. The radio network node is configured to communicate with a wireless device supporting both normal and extended coverage. The radio network node and the wireless device are operable in a communications network.

The radio network node is configured to determine an indication informing the wireless device that it, when in normal coverage, is to monitor one of a downlink legacy resource and an extended coverage resource for information and/or is to use one of an uplink legacy resource and an extended coverage resource when accessing the wireless communications network.

The radio network node is configured to transmit the indication to the wireless device.

According to another aspect of embodiments herein, a method for load balancing in a wireless communications network is performed by a wireless device.

The wireless device supports both normal coverage and extended coverage. The wireless device and a radio network node are operating in a communications network:

The wireless device receives an indication from the network, e.g. from a radio network node. The indication informs the wireless device that a wireless device in normal coverage is to monitor one of a downlink legacy resource and a downlink extended coverage resource for information and/or is to use one of a uplink legacy resource and an uplink extended coverage resource when accessing the communications network.

When the wireless device is in normal coverage, the wireless device monitors the one of the downlink legacy and extended coverage resources for information and/or accesses the communications network using the one of the uplink legacy and extended coverage resources.

According to another aspect of embodiments herein, a wireless device for load balancing in a wireless communications network is provided.

The wireless device is configured to support both normal coverage and extended coverage. The wireless device and a radio network node are operable in a communications network:

The wireless device is configured to receive an indication from the network, e.g. from a radio network node. The indication is configured to inform the wireless device that a wireless device in normal coverage is to monitor one of a downlink legacy resource and a downlink extended coverage resource for information and/or is to use one of a uplink legacy resource and an uplink extended coverage resource when accessing the communications network.

When the wireless device is in normal coverage, the wireless device is configured to monitor the one of the downlink legacy and extended coverage resources for information and/or to access the communications network using the one of the uplink legacy and extended coverage resources.

According to another aspect of embodiments herein, a method for load balancing in a wireless communications network is performed by a network node, e.g. a base station controller. The network node is configured to communicate with a radio network node that is configured to communicate with a wireless device supporting both normal coverage and extended coverage. The network node, the radio network node and the wireless device are operating in a communications network.

The network node determines an indication informing the wireless device that it, when in normal coverage, is to monitor one of a downlink legacy resource and an extended coverage resource for information and/or to use one of an uplink legacy resource and extended coverage resource when accessing the communication network.

The network node transmits the indication to the radio network node.

According to another aspect of embodiments herein, a network node for load balancing in a wireless communications network is provided. The network node is configured to communicate with a radio network node that is configured to communicate with a wireless device supporting both normal coverage and extended coverage. The network node, the radio network node and the wireless device are operating in a communications network.

The network node is configured to determine an indication informing the wireless device that it, when in normal coverage, is to monitor one of a downlink legacy resource and an extended coverage resource for information and/or to use one of an uplink legacy resource and extended coverage resource, when accessing the communication network.

The network node is configured to transmit the indication to the radio network node.

According to another aspect of embodiments herein, the object is achieved by a computer program, comprising instructions which, when executed on at least one processor, causes the at least one processor to carry out the method performed by the radio network node.

According to another aspect of embodiments herein, the object is achieved by a computer program, comprising instructions which, when executed on at least one processor, causes the at least one processor to carry out the method performed by the wireless device.

According to another aspect of embodiments herein, the object is achieved by a computer program, comprising instructions which, when executed on at least one processor, causes the at least one processor to carry out the method performed by the network node.

According to another aspect of embodiments herein, the object is achieved by a carrier comprising the computer program, wherein the carrier is one of an electronic signal, an optical signal, a radio signal or a computer readable storage medium.

Since the radio network node determines an indication informing the wireless device that it, when in normal coverage, is to monitor one of a downlink legacy resource and an extended coverage resource for information and/or is to use one of an uplink legacy resource and an extended coverage resource when accessing the wireless communications network, and since the radio network node transmits the indication to the wireless device, the wireless device when in normal coverage monitors and/or uses a resource in accordance with the indication, whereby the load on resources in the communications network is controlled. Thereby, a load balancing between resources in the communications network is provided. This results in an improved performance in the communications network.

An advantage of some embodiments herein is that it is possible to spread the load from wireless devices between the legacy resources, e.g. legacy Common Control CHannels (CCCHs), and the new Extended Coverage resources, e.g. the new Extended Coverage Common Control CHannels (EC-CCCHs).

Another advantage of some embodiments herein is that the communications network may select which wireless devices that should use which common control channels, e.g. the legacy CCCH or the EC-CCCH, when the devices are in normal coverage. That selection may then be based on e.g. priority of the device or some other factor.

BRIEF DESCRIPTION OF DRAWINGS

Examples of embodiments herein are described in more detail with reference to attached drawings in which:

FIG. 2 is a flowchart schematically illustrating embodiments of a method in a wireless device;

FIG. 3 is a block diagram schematically illustrating embodiments of a wireless device;

FIG. 4 is a flowchart schematically illustrating embodiments of a method in a radio network node;

FIG. 5 is a block diagram schematically illustrating embodiments of a radio network node;

FIG. 6 is a flowchart schematically illustrating embodiments of a method in a network node; and FIG. 7 is a block diagram schematically illustrating embodiments of a network node.

DETAILED DESCRIPTION

Figure 1:
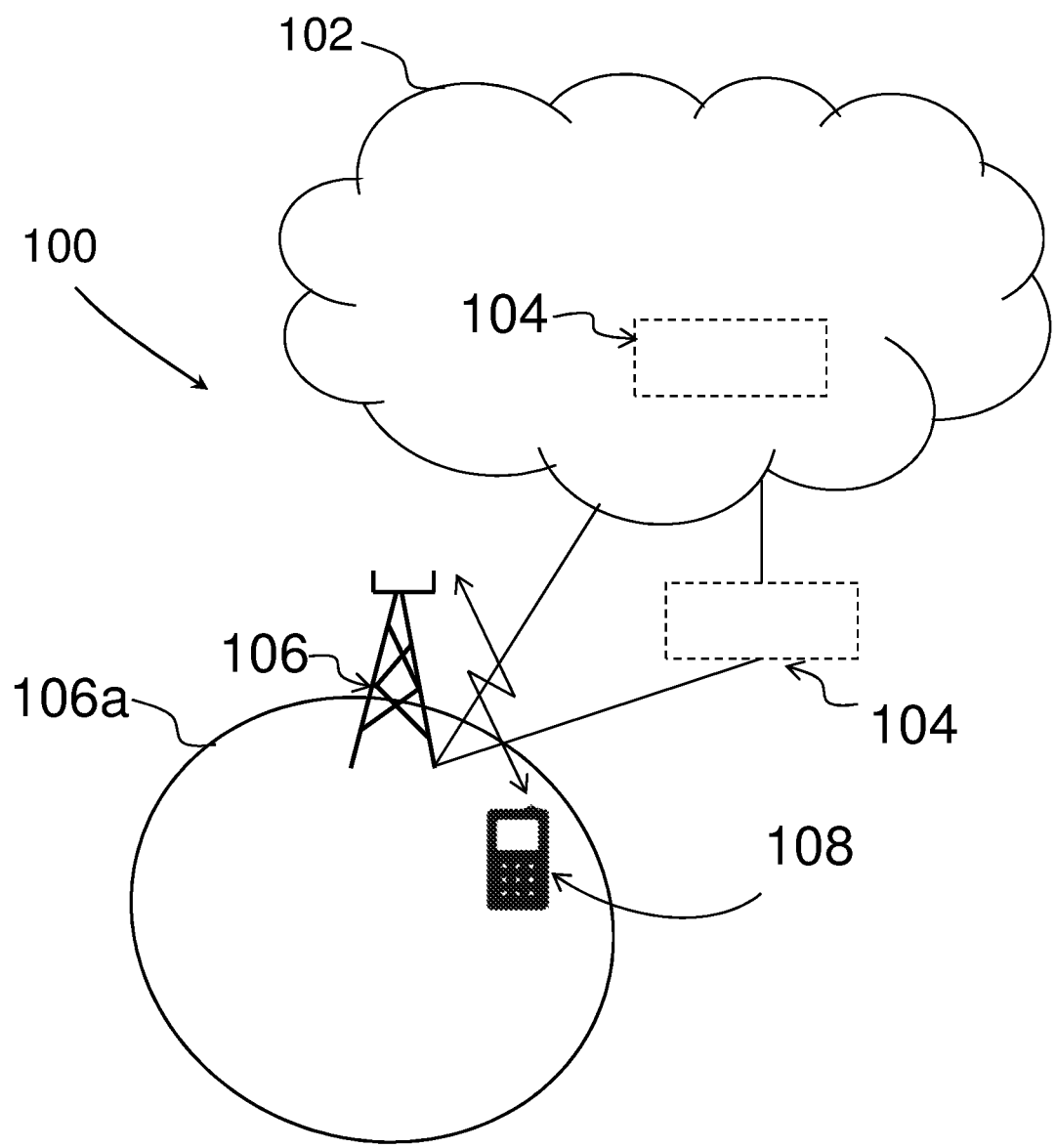
FIG. 1 schematically illustrates embodiments of a communications network.

As part of developing embodiments herein, some problems with the state of the art communications networks will first be identified and discussed.

It is forecasted that the radio access networks will be overwhelmed by connected devices, e.g. connected wireless devices. For example, it is forecasted that the radio access networks will have 50 billion connections by 2020. The common control channels thus risk being overloaded. In the UL both the legacy RACH, e.g. CCCH UL TS0, and the new EC-RACH, e.g. EC-CCCH UL TS1; have a risk of becoming overloaded, and if the load between these two channels is unbalanced the risk becomes more pronounced that one of them becomes a bottle neck. The same is true in the DL where the legacy AGCH and the EC-AGCH, and the legacy PCH and the EC-PCH channels will be exposed to the expected increase in connected devices. The load may rapidly change since it is no longer only the number of wireless devices that are of importance for the load of the channel but also the coverage a wireless device is in. A wireless device in a worse coverage, e.g. operating in the worse coverage, will require more resources and hence put more resource limitations on the system than a wireless device in a better coverage. By the expression "resource" when used in this disclosure is meant a channel or part(s) of a channel used for communication between a wireless device and a wireless communication network, e.g. between the wireless device and a radio network node. For example. in a GSM/EDGE network a resource refers to a time slot, or part(s) of a time slot, on a certain frequency channel. Thus, a legacy channel or part(s) of a legacy channel may be referred to as legacy resource and an extended coverage channel or part(s) of an extended coverage channel may be referred to as an extended coverage resource.

As mentioned, the EC-CCCH is designed to cater for devices, e.g. wireless devices, operating in extended coverage, needing several blind transmissions to gain system access. A wireless device in extreme coverage requiring e.g. 32 blind transmissions of a single access request message on the UL EC-RACH will consume roughly 32 times the radio resources a wireless device in normal coverage demands. It's hence evident that if a significant portion of all new wireless devices are located in the extended coverage range the strain on the EC-CCCH channels will become even more severe. By the expression "extreme coverage" when used herein is meant that the radio coverage is very poor and therefore not accessible with legacy radio network systems, such as GSM. Further, by the expression "normal coverage" when used herein is meant that the radio coverage is in parity with what is supported by legacy radio network systems, such as the GSM. The legacy radio network is thus accessible by the device when it is in normal coverage.

In addition to this, as the UL EC-RACH is a collision based channel shared among all users on TS1 the extended coverage will expose a radio network node, e.g. a radio base station also referred to as a Base Station (BS), to a new level of the classic near-far problem when resolving colliding access attempts from multiple users from different coverage classes. A first wireless device in extended coverage will in the UL rely on access to the BS at very low signal level over an extended period in time, and a second wireless device in normal coverage accessing the BS at the same time will expose the extended coverage access attempt by the first device to a very strong interference that may prove fatal, e.g. causing the first wireless device to be unsuccessful in accessing the BS.

Further, in order to save battery lifetime for wireless devices, work is ongoing in the 3GPP to extend the paging cycle. The time between two occurrences of the paging groups may be extended up to an hour or more. If it, due to an overload situation, is not possible to reach the device with the paging message, it might thus take a long time to the next paging opportunity. This may be fatal for certain MTC applications e.g. in the automation industry.

By embodiments herein, the load that is generated on the EC-CCCH by one or more devices, e.g. one or more wireless devices, supporting extended coverage may be dynamically spread between the legacy CCCH and the new EC-CCCH for the one or more wireless devices when operating in normal coverage.

The information about what common control channels the device, e.g. the wireless device, in normal coverage shall use is transmitted by the network, e.g. by a radio network node such as a radio base station, in messages on the downlink CCCH or EC-CCCH, or SCH or EC-SCH. In some embodiments, a network node such as a Base Station Controller (BSC) determines and sets a load balancing indication comprising the information about what common control channels to use, and the radio network node, e.g. the radio base station, transmits the load balancing indication to the device. According to some embodiments herein, the network transmits the information, e.g. the load balancing indication, as a new information element in either the access grant and paging messages and/or in the system information messages. The transmitted information indicates how devices, e.g. wireless devices, with device IDs in different ranges shall use different channels. Packet Temporary Mobile Subscriber Identity (P-TMSI), Temporary Logical Link Identifier (TLLI) and International Mobile Subscriber Identity (IMSI) are examples of device IDs. A device has just one IMSI and one P-TMSI (TLLI) in this context.

In order to overcome one or more of the drawbacks with the prior art, some embodiments herein relate to a method for load sharing between channels such as load sharing between control channels. Especially embodiments herein relate to load sharing between control channels of wireless devices operating in normal coverage in a communications network.

As schematically illustrated in FIG. 1, embodiments herein relate to a wireless communications network 100. The wireless communications network 100 may sometimes herein be referred to as a/the network, and may be a Universal Mobile Telecommunications System (UMTS) network, an LTE network, a WCDMA network, a GSM network, any 3GPP cellular network, Wimax, or any other wireless communication network or system.

The wireless communications network 100 comprises a core network 102. The core network 102 may be a UMTS core network, a LTE core network, a WCDMA core network, a GSM core network, any 3GPP cellular core network, a Wimax core network, or a core network of any other wireless communication network or system.

A network node 104 may be comprised in or arranged in communication with the core network 102. The network node 104 may be a Radio Network Controller (RNC) operating in an UMTS network. In some embodiments, the network node 104 is a Base Station Controller (BSC), a Mobile Switching Center (MSC), a Media Gateway (MGw), a Serving GPRS Support Node (SGSN) or a Mobility Management Entity (MME). Further, in some embodiments, the network node 104 is a base station.

A Radio Network Node (RNN) 106 is arranged and configured to operate in the wireless communication network 100. The RNN 106 is configured for wireless communication with wireless devices, such as a wireless device 108, when they are located within a geographical area 106a served by the RNN 106.

The RNN 106 may be a transmission point such as a radio base station, for example an eNB, an eNodeB, or an Home Node B, an Home eNode B or any other network node capable to serve a user equipment or a machine type communication device in a wireless communications network, such as the wireless communications network 100. The RNN may further be configured to communicate with the network node 104.

The wireless device 108, herein also referred to as device, a user equipment or UE, operates in the wireless communications network 100. The wireless device 108 may e.g. be a user equipment, a mobile terminal or a wireless terminal, a mobile phone, a computer such as e.g. a laptop, a Personal Digital Assistant (PDA) or a tablet computer, sometimes referred to as a surf plate, with wireless capability, or any other radio network units capable to communicate over a radio link in the wireless communications network 100. The wireless device 108 may also be referred to as a Machine Type of Communication (MTC) device, an Internet of Things (IoT) device, e.g. a Cellular IoT (CIoT) device. Please note the term user equipment used in this document also covers other wireless devices such as Machine to Machine (M2M) devices, even though they do not have any user.

Note that although terminology from GSM has been used in this disclosure to exemplify the embodiments herein, this should not be seen as limiting the scope of the embodiments herein to only the aforementioned system. Other wireless systems, comprising WCDMA, WiMax, Ultra Mobile Broadband (UMB) and LTE etc., may also benefit from exploiting the ideas covered within this disclosure.

In this section, the embodiments herein will be illustrated in more detail by a number of exemplary embodiments. It should be noted that these embodiments are not mutually exclusive. Components from one embodiment may be tacitly assumed to be present in another embodiment and it will be obvious to a person skilled in the art how those components may be used in the other exemplary embodiments.

In brief, some embodiments herein support flexible load balancing between, common channel resources, e.g. different common channel resources, that are used by the communications network 100, e.g. the radio network node 106, to send information, such as paging information, system information and/or access grant information, to the wireless device 108. Further, some embodiments herein support flexible load balancing between different common channel resources that are used by the wireless device 108 to access the network 100. Thereby, by embodiments herein it is possible to cope with the expected increased volume of connected wireless devices 108 operating in the communications network 100.

In this description, the expressions "load balancing" and "load sharing" are used interchangeably. Further, the expressions "coverage" and "radio coverage" are sometimes herein used interchangeably.

FIG. 2 schematically illustrates embodiments of a method performed by the wireless device 108 for load balancing in the wireless communications network 100. The wireless device 108 supports both normal coverage and extended coverage. In other words, the wireless device is able to operate in both normal coverage and extended coverage. The wireless device 108 and the radio network node 106 are operating in the communications network 100. One or more of the Actions below may be combined and/or performed in another suitable order. Further, one or more actions may be optional.

Action 201

The wireless device 108 receives an indication from the network 100, e.g. from the radio network node 106. The indication informs the wireless device 108 about one or more resources to monitor for broadcast information and/or about one or more resources to use when accessing the communications network 100.

For example, the wireless device 108 receives, from the radio network node 106, the indication informing the wireless device 108 that a wireless device in normal coverage is to monitor one of a downlink legacy resource and a downlink extended coverage resource for information and/or is to use one of an uplink legacy resource and an uplink extended coverage resource when accessing the wireless communications network 100. As mentioned above, the wireless device 108 supports both normal coverage and extended coverage, and therefore the wireless device 108 is able to monitor and/or use both a legacy resource and an extended coverage resource when it is in normal coverage. Thus, even if the wireless device 108 is in normal coverage it does not have to use a legacy resource as in the prior art but it may be informed by the radio network node 106 to use an extended coverage resource. Thereby, the radio network node 106 may control the load on resources in the communications network 100 and balancing the load from several wireless devices by instructing them to use one or more legacy resources and/or one or more extended coverage resources.

The downlink legacy resource may be an SCH, a BCCH, or a CCCH, such as a PCH, or an AGCH, and the downlink extended coverage resource may be an EC-SCH, an EC-BCCH, or an EC-CCCH, such as an EC-PCH or an EC-AGCH.

Further, the uplink legacy resource is a CCCH, such as a RACH, and the uplink extended coverage resource is an EC-CCCH, such as an EC-RACH.

In some embodiments, the wireless device 108 receives the indication in a System Information message on the BCCH and/or the EC-BCCH, in a synchronization message on the SCH and/or the EC-SCH, or in an access grant or paging message on the CCCH and/or the EC-CCCH.

Action 202

Based on the received indication, the wireless device 108 may monitor the one or more resources for broadcast information.

For example, when the wireless device 108 is in normal coverage, the wireless device 108 may monitor the one of the downlink legacy and extended coverage resources for information. Thus, when the wireless device 108 is in normal coverage, the wireless device 108 may monitor the indicated one of the downlink legacy and extended coverage resources for information.

In some embodiments, wherein the indication is based on one or more device identities, the wireless device 108 monitors the one of the downlink legacy and extended coverage resources when a device identity of the wireless device 108 corresponds to the one or more device identities. For example, a wireless device having a device identity belonging to a first group of values may be instructed to do in one way, e.g. to monitor and/or use a legacy resource, while a wireless device having a device identity belong to a second group of values may be instructed to do in another way, e.g. to monitor and/or use an extended coverage resource.

The one or more device identities may be given by one or more of a Packet Temporary Mobile Subscriber Identity (P-TMSI), a Temporary Logical Link Identifier (TLLI), or an International Mobile Subscriber Identity (IMSI).

Action 203

In some embodiments, the wireless device 108 accesses the communications network 100 with the one or more resources.

For example, when the wireless device 108 is in normal coverage, the wireless device 108 may access the wireless communications network 100 using the one of the uplink legacy and extended coverage resources as indicated in the received indication from the radio network node 106.

In some embodiments, wherein the indication is based on one or more device identities, the wireless device 108 accesses the communications network 100 using the one of the uplink legacy and extended coverage resources when the identity of the wireless device 108 corresponds to the one or more device identities.

According to some embodiments, cf. e.g. FIG. 3, the wireless device 108 comprises means configured to perform one or more of the actions mentioned above as being performed by the processing unit. For example, the wireless device 108 may comprise an input/output interface 300, a receiving module 301 and a transmitting module 302 configured to realize the communication described above or parts thereof. In some embodiments, the wireless device 108 comprises one or more modules or units, such as a monitoring module 303, and an accessing module 304 etc., configured to perform one or more of the actions mentioned above as being performed by the processing unit, e.g. by a processor 306. Thus, embodiments herein relate to the wireless device 108 for load balancing in the wireless communications network 100. The wireless device 108 supports both normal coverage and extended coverage. This means that the wireless device 108 is able to operate in both normal coverage and extended coverage. As previously mentioned, the wireless device 108 and the radio network node 106 are operating in the wireless communications network 100.

The wireless device 108 is configured to receive, e.g. by means of the receiving module 301, an indication from the radio network node 106. The indication informs the wireless device 108 that a wireless device in normal coverage is to monitor one of a downlink legacy resource and a downlink extended coverage resource for information and/or is to use one of an uplink legacy resource and an uplink extended coverage resource when accessing the wireless communications network 100.

As previously mentioned, the downlink legacy resource may be a SCH, a BCCH, or a CCCH, such as a PCH, or an AGCH, and the downlink extended coverage resource may be an EC-SCH, an EC-BCCH, or an EC-CCCH, such as an EC-PCH or an EC-AGCH. Further, the uplink legacy resource may be a CCCH, such as a RACH, and the uplink extended coverage resource may be an EC-CCCH, such as an EC-RACH.

In some embodiments, the wireless device 108 is configured to receive the indication in a System Information message on the BCCH and/or the EC-BCCH, in a synchronization message on the SCH and/or the EC-SCH, in an access grant or paging message on the CCCH and/or the EC-CCCH.

Further, when in normal coverage, the wireless device 108 is configured to monitor, e.g. by means of the monitoring module 303, the one of the downlink legacy and extended coverage resources for information. The wireless deceive 108 is configured to monitor the one of the downlink legacy and extended coverage resources for information based on the received indication.

In some embodiments, the indication is based on one or more device identities. In such embodiments, the wireless device 108 is configured to monitor the one of the downlink legacy and extended coverage resources when a device identity of the wireless device 108 corresponds to the one or more device identities.

As previously mentioned, the one or more device identities may be given by one or more of a P-TMSI, a TLLI, or an IMSI.

Furthermore, when in normal coverage, the wireless device 108 is configured to access, e.g. by means of the accessing module 304, the wireless communications network 100 using the one of the uplink legacy and extended coverage resources. The wireless device 108 is configured to access the wireless communications network 100 using the one of the uplink legacy and extended coverage resources based on the received indication.

In some embodiments, the indication is based on one or more device identities. In such embodiments, the wireless device 108 is configured to access the communications network 100 using the one of the uplink legacy and extended coverage resources when the identity of the wireless device 108 corresponds to the one or more device identities.

As schematically illustrated in FIG. 3, the embodiments herein may be implemented through one or more processors, such as the processor 306 in the wireless device 108, together with computer program code for performing the functions and actions of the embodiments herein. The program code may be implemented in the wireless device. The program code mentioned above may also be provided as a computer program product, for instance in the form of a data carrier carrying computer program code for performing the embodiments herein when being loaded into the wireless device. One such carrier may be in the form of a CD ROM disc. It is however feasible with other data carriers such as a memory stick. The computer program code may furthermore be provided as pure program code on a server and downloaded to the wireless device.

The wireless device 108 may further comprise a memory 305 comprising one or more memory units. The memory is arranged to be used to store obtained information, store data, configurations, schedulings, and applications etc. to perform the methods herein when being executed in the wireless device 108.

Those skilled in the art will also appreciate that embodiments herein comprises one or more modules to realize features and functions and to perform actions described herein. The modules may refer to a combination of analog and digital circuits, and/or one or more processors configured with software and/or firmware, e.g. stored in the memory, that when executed by the one or more processors such as the processors in the RAN, the network node and communication device perform as described above. One or more of these processors, as well as the other digital hardware, may be included in a single application-specific integrated circuitry (ASIC), or several processors and various digital hardware may be distributed among several separate components, whether individually packaged or assembled into a system-on-a-chip (SoC).

FIG. 4 schematically illustrates a method in the communications network 100, e.g. performed by the radio network node 106. Especially, FIG. 4 schematically illustrates a method performed by the radio network node 106 for load balancing in the wireless communications network 100. The radio network node 106 is configured to communicate with the wireless device 108 supporting both normal coverage and extended coverage. The radio network node 106 and the wireless device (108) are operating in the communications network 100. One or more of the Actions below may be combined and/or performed in another suitable order. Further, one or more actions may be optional.

Action 401

The radio network node 106 may determine a need of load balancing or receive an indication about a need of load balancing from a network node 104 comprised in the communications network 100.

Thus, the radio network node 106 may determine a need of load balancing between a legacy resource and an extended coverage resource, wherein the legacy and the extended coverage resources are downlink legacy and extended coverage resources or uplink legacy and extended overage resources.

In some embodiments, the radio network node 106 determines the need of load balancing between the legacy resource and the extended coverage resource, by determining a load balancing between the legacy resource and the extended coverage resource based on one or more device identities.

For example, the radio network node 106 may determine that a wireless device having a device identity belonging to a first group of values may be instructed to do in one way, e.g. to monitor and/or use legacy resource, while a wireless device having a device identity belonging to a second group of values may be instructed to do in another way, e.g. to monitor and/or use an extended coverage resource.

The one or more device identities may be given by one or more of a P-TMSI, a TLLI, or an IMSI.

In some embodiments, the radio network node 106 determines the need of load balancing between the legacy resource and the extended coverage resource by determining a load balancing between the legacy resource and the extended coverage resource based on a priority associated with the wireless device 108. Thus, the radio network node 106 may determine not only that there is a need for load balancing in the communications network 100, but also how the load should be balanced, e.g. shared, between wireless devices operating in the communications network 100.

The downlink legacy resource may be a SCH, a BCCH, or a CCCH, such as a PCH, or an AGCH.

The downlink extended coverage resource may be an EC-SCH, an EC-BCCH, or an EC-CCCH, such as an EC-PCH or an EC-AGCH.

Further, the uplink legacy resource may be a CCCH, such as a RACH, and the uplink extended coverage resource may be an EC-CCCH, such as an EC-RACH.

Action 402

The radio network node 106 determines the indication informing the wireless device 108 that it, when in normal coverage, is to monitor one of a downlink legacy resource and an extended coverage resource for information and/or is to use one of an uplink legacy resource and an extended coverage resource when accessing the wireless communications network 100. This may also be expressed as the indication is indicating to the wireless device 108, when in normal coverage, which one of a legacy resource and an extended coverage resource to monitor and/or which one of an uplink legacy resource and an extended coverage resource to use when accessing the wireless communications network 100.

The radio network node 106 may determine the indication, e.g. the load balancing indication, based on the need of load balancing.

In some embodiments, the radio network node 106 determines the indication based on one or more device identities.

Action 403

The radio network node 106 transmits the indication to one or more wireless devices, e.g. to the wireless device 108, operating in the communications network 100. As mentioned above, the indication informs the one or more wireless devices 108 about one or more resources to monitor for broadcast information and/or about one or more resources to use when accessing the communications network 100.

In some embodiments, the radio network node 106 transmits the indication in a System Information message using the BCCH and/or the EC-BCCH, in a synchronization message using the SCH and/or the EC-SCH and/or in an access grant or paging message using the CCCH and/or the EC-CCCH.

Action 404

The radio network node 106 may receive, e.g. from a network node 104, a paging message for a specific wireless device 108. In some embodiments, the radio network node 106 transmits the paging message on the resources for the specific wireless device 108, which resources correspond to the resources indicated in the transmitted indication, e.g. the transmitted load balancing indication.

Action 405

The radio network node 106 may receive an access request from one or more of the wireless device, e.g. from the wireless device 108, which access request is based on the transmitted indication.

According to some embodiments, cf. e.g. FIG. 5, the radio network node 106 comprises means configured to perform one or more of the actions mentioned above as being performed by the processing unit. For example, the radio network node 106 may comprise an input/output interface 500, a receiving module 501 and a transmitting module 502 configured to realize the communication described above or parts thereof. In some embodiments, the radio network node 106 comprises one or more modules or units, such as a determining module 503 etc., configured to perform one or more of the actions mentioned above as being performed by the processing unit, e.g. a processor 505.

Thus, a radio network node 106 for load balancing in a wireless communications network 100 may comprise one or more of the modules mentioned above. As previously mentioned, the radio network node 106 is configured to communicate with the wireless device 108 supporting both normal coverage and extended coverage. Further, the radio network node 106 and the wireless device 108 are operating in the wireless communications network 100.

The radio network node 106 is configured to determine, e.g. by the determining module 503, an indication informing the wireless device 108 that it, when in normal coverage, is to monitor one of a downlink legacy resource and an extended coverage resource for information and/or is to use one of an uplink legacy resource and an extended coverage resource when accessing the wireless communications network 100.

In some embodiments, the radio network node 106 is configured to determine the indication based on one or more device identities. The one or more device identities may be given by one or more of a P-TMSI, a TLLI, or an IMSI.

The radio network node 106 may be configured to determine a need of load balancing between a legacy resource and an extended coverage resource. The legacy and the extended coverage resources may be downlink legacy and extended coverage resources or uplink legacy and extended overage resources. Further, the radio network node 106 may be configured to determine the indication based on the need of load balancing.

In some embodiments, the radio network node 106 is configured to determine the need of load balancing between the legacy resource and the extended coverage resource, by further being configured to determine a load balancing between the legacy resource and the extended coverage resource based on one or more device identities.

The radio network node 106 may be configured to determine the need of load balancing between the legacy resource and the extended coverage resource, by further being configured to determine a load balancing between the legacy resource and the extended coverage resource based on a priority associated with the wireless device 108.

The downlink legacy resource may be an SCH, a BCCH, or a CCCH, such as a PCH or an AGCH, and wherein the downlink extended coverage resource may be an EC-SCH, an EC-BCCH, or an EC-CCCH, such as an EC-PCH or an EC-AGCH.

The uplink legacy resource may be a CCCH such as a RACH, and the uplink extended coverage resource may be an EC-CCCH, such as an EC-RACH.

Further, the radio network node 106 is configured to transmit, e.g. by means of the transmitting module 502, the indication to the wireless device 108.

The radio network node 106 may be configured to transmit the indication in a System Information message using the BCCH and/or the EC-BCCH, in a synchronization message using the SCH and/or the EC-SCH, in an access grant or paging message using the CCCH and/or the EC-CCCH.

As schematically illustrated in FIG. 5, the embodiments herein may be implemented through one or more processors, such as the processor 505 in the radio network node 106 together with computer program code for performing the functions and actions of the embodiments herein. The program code may be implemented in one or several network nodes both in the cellular network and/or in a non-cellular network. The program code mentioned above may also be provided as a computer program product, for instance in the form of a data carrier carrying computer program code for performing the embodiments herein when being loaded into the radio network node. One such carrier may be in the form of a CD ROM disc. It is however feasible with other data carriers such as a memory stick. The computer program code may furthermore be provided as pure program code on a server and downloaded to the radio network node.

The radio network node 106 may further comprise a memory 504 comprising one or more memory units. The memory is arranged to be used to store obtained information, store data, configurations, schedulings, and applications etc. to perform the methods herein when being executed in the radio network node 106.

Those skilled in the art will also appreciate that embodiments herein comprises one or more modules to realize features and functions and to perform actions described herein. The modules may refer to a combination of analog and digital circuits, and/or one or more processors configured with software and/or firmware, e.g. stored in the memory, that when executed by the one or more processors such as the processors in the RAN, the network node and communication device perform as described above. One or more of these processors, as well as the other digital hardware, may be included in a single application-specific integrated circuitry (ASIC), or several processors and various digital hardware may be distributed among several separate components, whether individually packaged or assembled into a system-on-a-chip (SoC).

FIG. 6 schematically illustrates a method in the communications network 100, e.g. performed by the network node 104. Especially, FIG. 6 A schematically illustrates a method performed by the network node 104 for load balancing in the wireless communications network 100. The network node 104 is configured to communicate with the radio network node 106 that is configured to communicate with the wireless device 108 supporting both normal coverage and extended coverage. The network node 104, the radio network node 106 and the wireless device 108 are operating in the communications network 100. One or more of the Actions below may be combined and/or performed in another suitable order. Further, one or more actions may be optional.

Action 601

The network node 104 may determine a need of load balancing.

In some embodiments, the network node 104 determines the need of load balancing between a legacy resource and an extended coverage resource, wherein the legacy and the extended coverage resources are downlink legacy and extended coverage resources or uplink legacy and extended coverage resources.

The network node 104 may determine the need of load balancing between the legacy resource and the extended coverage resource, by determining a load balancing between the legacy resource and the extended coverage resource.

In some embodiments, the network node 104 determines the load balancing between the legacy resource and the extended coverage resource by determining the load balancing based on a priority associated with the wireless device 108.

As previously mentioned, the downlink legacy resource may be a SCH, a BCCH, or a CCCH, such as a PCH, or an AGCH, and the downlink extended coverage resource may be an EC-SCH, an EC-BCCH, or an EC-CCCH, such as an EC-PCH or an EC-AGCH. Further, the uplink legacy resource may be a CCCH, such as a RACH, and the uplink extended coverage resource may be an EC-CCCH, such as an EC-RACH.

Action 602

The network node 104 may allocate a device identity for the wireless device 108 when determining the load balancing or when determining the need of load balancing. Thus, the network node 104 may allocate the device identity for the wireless device in dependence of the determined load balancing or the determined need of load balancing. For example, the device identity may be allocated such that the wireless device 108 is instructed to monitor either a downlink legacy resource or a downlink extended coverage resource for information and/or is to use either an uplink legacy resource or an uplink extended coverage resource when accessing the wireless communications network 100.

As previously mentioned, the device identity may be given by a P-TMSI; a Temporary TLLI; or an IMSI.

Action 603

The network node 104 determines an indication informing the wireless device 108 that it, when in normal coverage, is to monitor one of a downlink legacy and an extended coverage resources for information and/or is to use one of an uplink legacy and an extended coverage resource when accessing the wireless communications network 100.

In some embodiments, the network node 104 determines an indication based on the need of load balancing.

The network node 104 may determine the indication based on one or more device identities.

For example, the network node 104 may determine that a wireless device 108 having a device identity belonging to a first group of values may be instructed to do in one way, e.g. to monitor and/or use legacy resource, while a wireless device 108 having a device identity belonging to a second group of values may be instructed to do in another way, e.g. to monitor and/or use an extended coverage resource.

The one or more device identities may be given by one or more of a P-TMSI, a TLLI, or an IMSI.

Action 604

The network node 104 transmits the indication to one or more radio network nodes, e.g. to the radio network node 106, operating in the communications network 100. The indication is intended to inform one or more wireless devices 108 operating in the communications network 100 about one or more resources to monitor for broadcast information of about one or more resources to use when accessing the communications network 100.

According to some embodiments, cf. e.g. FIG. 7, the network node 104 comprises means configured to perform one or more of the actions mentioned above as being performed by the processing unit. For example, the network node 104 may comprise an input/output interface 700, a receiving module 701 and a transmitting module 702 configured to realise the communication described above or parts thereof. In some embodiments, the network node 104 comprises one or more modules or units, such as a determining module 703 etc., configured to perform one or more of the actions mentioned above as being performed by the processing unit, e.g. a processor 706. Thus, a network node 104 for load balancing in a wireless communications network 100 may comprise one or more of the modules mentioned above. As previously mentioned, network node 104 is configured to communicate with the radio network node 106 that is configured to communicate with the wireless device 108 supporting both normal coverage and extended coverage. Further, the network node 104, the radio network node 106 and the wireless device 108 are operating in the wireless communications network 100.

The network node 104 is configured to determine, e.g. by means of the determining module 703, an indication. The indication is configured to inform the wireless device 108 that it, when in normal coverage, is to monitor one of a downlink legacy and an extended coverage resources for information and/or is to use one of an uplink legacy and an extended coverage resource when accessing the wireless communications network 100.

As previously mentioned, the downlink legacy resource may be a SCH, a BCCH, or a CCCH, such as a PCH, or an AGCH, and the downlink extended coverage resource may be an EC-SCH, an EC-BCCH, or an EC-CCCH, such as an EC-PCH or an EC-AGCH. Further, the uplink legacy resource may be a CCCH, such as a RACH, and the uplink extended coverage resource may be an EC-CCCH, such as an EC-RACH.

In some embodiments, the network node 104 is configured to determine a need of load balancing between a legacy resource and an extended coverage resource.

The legacy and the extended coverage resources may be downlink legacy and extended coverage resources or uplink legacy and extended overage resources.

The network node 104 may be configured to determine the indication based on the need of load balancing.

In some embodiments, the network node 104 is configured to determine the need of load balancing between the legacy resource and the extended coverage resource, by being configured to determine the load balancing between the legacy resource and the extended coverage resource. The network node 104 may be configured to determine the load balancing based on a priority associated with the wireless device 108.

The network node 104 may be configured to determine the indication based on one or more device identities.

As previously mentioned, the device identity may be given by a P-TMSI; a TLLI; or an IMSI.

The network node 104 is configured to transmit, e.g. by means of the transmitting module 702 configured to transmit, the indication to the radio network node 106.

The network node 104 may be configured to allocate, e.g. by means of the allocating module 704, a device identity for the wireless device 108 when determining the load balancing.

As schematically illustrated in FIG. 7 the embodiments herein may be implemented through one or more processors, such as the processor 706 in the network node 104, together with computer program code for performing the functions and actions of the embodiments herein. The program code may be implemented in one or several network nodes both in the cellular network and/or in a non-cellular network. The program code mentioned above may also be provided as a computer program product, for instance in the form of a data carrier carrying computer program code for performing the embodiments herein when being loaded into the network node. One such carrier may be in the form of a CD ROM disc. It is however feasible with other data carriers such as a memory stick. The computer program code may furthermore be provided as pure program code on a server and downloaded to the network node.

The network node 104 may further comprise a memory 705 comprising one or more memory units. The memory is arranged to be used to store obtained information, store data, configurations, schedulings, and applications etc. to perform the methods herein when being executed in the network node 104.

Those skilled in the art will also appreciate that embodiments herein comprises one or more modules to realize features and functions and to perform actions described herein. The modules may refer to a combination of analog and digital circuits, and/or one or more processors configured with software and/or firmware, e.g. stored in the memory, that when executed by the one or more processors such as the processors in the RAN, the network node and communication device perform as described above. One or more of these processors, as well as the other digital hardware, may be included in a single application-specific integrated circuitry (ASIC), or several processors and various digital hardware may be distributed among several separate components, whether individually packaged or assembled into a system-on-a-chip (SoC).

Exemplifying Embodiments

In some embodiments, an indication, e.g. a network indication, is provided which indication informs the wireless device 108 about which resources to monitor for broadcast information, e.g. on broadcast channels or common control channels, and/or which resources to use when accessing the communications network 100, e.g. on random access channel. The indication may be applicable only to some wireless devices operating in the network 100 and belonging to one or more device classes. The one or more device classes may be predefined. Wireless devices not belonging to those device classes are unaffected by the indication.

In some embodiments, the device class is based on the coverage, e.g. the radio coverage, of the wireless device 108. For example, only wireless devices 108 belonging to one, a few or, as an option, all defined coverage classes may be affected by the indication. For example, the coverage class may be normal coverage or different levels of extended coverage, where the different levels of extended coverage may correspond to that different numbers of repetitions are required in order to achieve accessibility for a device.

In some embodiments, the indication is based on ranges of device ID, or one or more flags in a DL block, e.g. a DL transmission. The indication may be based on ranges of device ID such that wireless devices with a device ID belonging to a certain range of device IDs are informed to use certain resources whereas wireless devices with a device ID belonging to another range of device IDs are informed to use other resources. For example, the indication could be sent as e.g. the device IDs that shall select the CCCHs (whereas devices with the other device IDs shall select the EC-CCCH), valid for wireless devices of some coverage classes. The device IDs could then be indicated in ranges, e.g. values from 0-4095 should do in one way whereas 4096-max should do in the other. Further, the indication may be based on one or more flags in the DL block such that the flag indicates what resources devices with, for example, different device IDs shall use.

Further, in some embodiments, the indication is communicated from the network 100, e.g. from the radio network node 106, to the wireless device 108 by the use of System Information transmitted on a broadcast channel or a synchronization message transmitted on the Synchronization Channel, or an access grant message or a paging message transmitted on a common control channel, e.g. an Access Grant channel or a Paging Channel.

Below, embodiments herein will be described in more detail when applied to the Extended Coverage—GSM (EC-GSM), wherein support for flexible load balancing between the legacy CCCH, comprising RACH, PCH and AGCH, and the EC-CCCH, comprising EC-RACH, EC-PCH and EC-AGCH channels, is enabled in order to cope with the expected increased volume in connected wireless devices 108. It should however be noted that the general principle of embodiments herein is applicable to any network 100 wherein load balancing between a legacy channel and an extended coverage channel would be advantageous in order to handle an increased number of devices operating in the network 100.

In some embodiments, the wireless device 108 supporting extended coverage may, when in normal coverage, send to the network 100, e.g. to the radio network node 106, its access request(-s) using the legacy Random Access CHannel (RACH) on TS0, or the EC-RACH on TS1. Further, if the wireless device 108 does not support extended coverage, but is aware of the EC-CCCH on TS1, the wireless device 108 may similarly utilize RACH, or EC-RACH when transmitting its access request to the network 100. In the downlink this load balancing further applies to the paging on the PCH or the EC-PCH. Thus, according to some embodiments, if the wireless device 108 has reported to the network 100 that it is in normal coverage, it shall listen to its paging group either on the EC-PCH or on the PCH, based on the load sharing control information it has received from the network 100.

In some embodiments, information to control the load sharing is sent from the network 100 in the System Information message over the BCCH on TS0, or over the EC-BCCH on TS1, or on both.

In some embodiments, the control mechanism is based on a device ID, for example a Packet Temporary Mobile Subscriber Identity (P-TMSI) or Temporary Logical Link Identifier (TLLI) value, assigned to the wireless device 108. In some other embodiments, the load sharing is based on a randomly generated number. The randomly generated number may be randomly generated by the wireless device 108 or by the network 100, e.g. the radio network node 106, the core network 102 or the network node 104. In this description, any value associated with the wireless device 108, being an assigned ID by the network 100, a unique ID for the wireless device 108, or a randomly generated number, is referred to as a 'device ID'.

The control information may, for example, indicate how the wireless devices 108 in normal coverage shall be spread between the different common control channels, e.g. between the EC-CCCH and the CCCH. Further, the control information may also indicate which channel to apply in which direction, e.g. in the DL and/or the UL. In some embodiments, the use of the different channels is based on which range of device IDs the ID of the wireless device belongs to. For example, devices that have a device ID belonging to a certain range of device IDs, according to indication from the network 100, shall use one set of channels, whereas wireless devices with a device ID belonging to another range of device IDs shall use another set of channels. The device ID may for example be the P-TMSI or the TLLI as mentioned above, or an International Mobile Subscriber Identity (IMSI) of the wireless device 108.

Since the P-TMSI and/or the TLLI value is allocated by the network 100, it is possible for the network 100 to use an algorithm that allows spreading the load from wireless devices in normal coverage at the point in time of assigning a P-TMSI and/or TLLI value. When choosing the P-TMSI and/or the TLLI value for the wireless device 108, the network 100 then has the possibility to choose what common control channels, e.g. the CCCH or the EC-CCCH, the wireless device 108 shall use.

In some embodiments, the information in the system information is discriminating the load balancing on the CCCH UL (CCCH/U) or the EC-CCCH UL (EC-CCCH/U), and on the CCCH DL (CCCH/D) or the EC-CCCH DL (EC-CCCH/D). For example, this will be beneficial in a scenario where the load on the EC-CCCH/U is high, while being low on the EC-CCCH/D on TS1. Then it is beneficial to move system access of devices from the EC-RACH on TS1 to the RACH on TS0, while the same devices are still paged on the EC-PCH over TS1 in case the PCH on TS0 is loaded.

In some embodiments, the information on load balancing is sent over the CCCH/D and/or the EC-CCCH/D in access grant messages and/or paging messages.

It yet some embodiments, the load balancing information is comprised in a new message that is sent in the (EC-)CCCH/D, e.g. on the CCCH/D or the EC-CCCH/D.

In some embodiments, the load balancing information is sent on the downlink synchronization channel, e.g. the SCH or the EC-SCH. This information would be available every time the wireless device 108 synchronizes to a cell 106a, and may e.g. with a single bit direct devices to use the CCCH or the EC-CCCH channels.

In some embodiments, the load steering information on the SCH and the information conveyed over the (EC-)CCCH, e.g. the CCCH/D or the EC-CCCH/D, is combined to enable more sophisticated steering mechanisms.

In some embodiments, the choice of random access channel, e.g. the RACH on TS0 or the EC-RACH on TS1, at system access of the wireless device 108 is based on a combination of the load balancing information sent by the network 100, and a device specific information, such as information about the type of device, the capability of the device and/or the amount of data that the device is requesting the UL transfer for. As an option, the choice of random access channel for the wireless device 108 when in normal coverage is based only on the device specific information.

The load on the common control channels, e.g. the EC-CCCH and the CCCH, respectively, from the wireless devices 108 in "normal coverage" will be dynamic with the proposed embodiments since the network 100 may update the load balancing control information it transmits.

If for example no P-TMSI and/or TLLI is available for the wireless device 108, the paging channel that it shall use when in normal coverage may be specified in the system information to be either the PCH or the EC-PCH. The same principle may be applied for the choice of random access channel, e.g. the RACH or the EC-RACH.

ABBREVIATION EXPLANATION

BCCH Broadcast Control Channel
BSIC Base Station Identification Code
CCCH Common Control Channel
CCCH/D Common Control Channel in the Downlink
CCCH/U Common Control Channel in the Uplink
CIoT Cellular Internet of Things
DL Downlink
EC Extended Coverage
GSM Global System for Mobile
IoT Internet of Things
CIoT Cellular Internet of Things
TDMA Time Division Multiple Access
TN Timeslot Number
TS Timeslot
UL Uplink When using the word "comprise" or "comprising" it shall be interpreted as non-limiting, i.e. meaning "consist at least of". Further, the word "a" or "an" should be understood to refer to "at least one" or to "one or more" if not explicitly stated that it refers to a "single" entity.

The embodiments herein are not limited to the above described preferred embodiments. Various alternatives, modifications and equivalents may be used.

The invention claimed is:

1. A method performed by a radio network node for load balancing in a wireless communications network, wherein the radio network node is configured to communicate with a wireless device supporting both normal coverage and extended coverage, wherein the radio network node and the wireless device are operating in the wireless communications network, and wherein the method comprises:

determining an indication informing the wireless device of at least one of the following:
that the wireless device, when in normal coverage, is to monitor one of a downlink legacy resource and an extended coverage resource for information, and that the wireless device, when in normal coverage, is to use one of an uplink legacy resource and an extended coverage resource when accessing the wireless communications network; and transmitting the indication to the wireless device;

the method further comprising:

determining a need for load balancing between a legacy resource and an extended coverage resource, wherein the legacy and the extended coverage resources are downlink legacy and extended coverage resources or uplink legacy and extended overage resources; and wherein the determining of the indication comprises:

determining the indication based on the need for load balancing.

2. The method of claim 1, wherein the determining of the need for load balancing between the legacy resource and the extended coverage resource, further comprises:

determining a load balancing between the legacy resource and the extended coverage resource based on one or more device identities.

3. The method of claim 2, wherein the one or more device identities are given by one or more of a Packet Temporary Mobile Subscriber Identity (P-TMSI), a Temporary Logical Link Identifier (TLLI), or an International Mobile Subscriber Identity (IMSI).

4. The method of claim 1, wherein the determining of the need for load balancing between the legacy resource and the extended coverage resource, further comprises:

determining a load balancing between the legacy resource and the extended coverage resource based on a priority associated with the wireless device.

5. A method performed by a radio network node for load balancing in a wireless communications network, wherein the radio network node is configured to communicate with a wireless device supporting both normal coverage and extended coverage, wherein the radio network node and the wireless device are operating in the wireless communications network, and wherein the method comprises:

determining an indication informing the wireless device of at least one of the following:

that the wireless device, when in normal coverage, is to monitor one of a downlink legacy resource and an extended coverage resource for information, and that the wireless device, when in normal coverage, is to use one of an uplink legacy resource and an extended coverage resource when accessing the wireless communications network; and transmitting the indication to the wireless device;

wherein the determining of the indication further comprises:

determining the indication based on one or more device identities.

6. A method performed by a radio network node for load balancing in a wireless communications network, wherein the radio network node is configured to communicate with a wireless device supporting both normal coverage and extended coverage, wherein the radio network node and the wireless device are operating in the wireless communications network, and wherein the method comprises:

determining an indication informing the wireless device of at least one of the following:

that the wireless device, when in normal coverage, is to monitor one of a downlink legacy resource and an extended coverage resource for information, and that the wireless device, when in normal coverage, is to use one of an uplink legacy resource and an extended coverage resource when accessing the wireless communications network; and transmitting the indication to the wireless device;

wherein the downlink legacy resource is a Synchronization Channel (SCH), a Broadcast Channel (BCCH), or a Common Control Channel (CCCH), and wherein the downlink extended coverage resource is an Extended Coverage SCH (EC-SCH), an Extended Coverage BCCH (EC-BCCH), or an Extended Coverage CCCH (EC-CCCH).

7. The method of claim 6, wherein the transmitting of the indication comprises transmitting the indication in one of: a System Information message using the BCCH and/or the EC-BCCH; a synchronization message using the SCH and/or the EC-SCH; and an access grant or paging message using the CCCH and/or the EC-CCCH.

8. A method performed by a radio network node for load balancing in a wireless communications network, wherein the radio network node is configured to communicate with a wireless device supporting both normal coverage and extended coverage, wherein the radio network node and the wireless device are operating in the wireless communications network, and wherein the method comprises:

determining an indication informing the wireless device of at least one of the following:

that the wireless device, when in normal coverage, is to monitor one of a downlink legacy resource and an extended coverage resource for information, and that the wireless device, when in normal coverage, is to use one of an uplink legacy resource and an extended coverage resource when accessing the wireless communications network; and transmitting the indication to the wireless device;

wherein the uplink legacy resource is a Common Control Channel (CCCH), and wherein the uplink extended coverage resource is an Extended Coverage CCCH (EC-CCCH).

9. A radio network node for load balancing in a wireless communications network, wherein the radio network node is configured to communicate with a wireless device supporting both normal coverage and extended coverage, wherein the radio network node and the wireless device are operating in the wireless communications network, and wherein the radio network node comprises a processor and memory, the memory being operatively coupled to the processor and containing program instructions for execution by the processor, whereby the radio network node is configured to:

determine an indication informing the wireless device of at least one of the following:

that the wireless device, when in normal coverage, is to monitor one of a downlink legacy resource and an extended coverage resource for information, and that the wireless device, when in normal coverage, is to use one of an uplink legacy resource and an extended coverage resource when accessing the wireless communications network; and transmit the indication to the wireless device;

the radio network node further being configured to:

determine the indication based on one or more device identities.

10. The radio network node of claim 9, wherein the one or more device identities are given by one or more of a Packet Temporary Mobile Subscriber Identity (P-TMSI), a Temporary Logical Link Identifier (TLLI), or an International Mobile Subscriber Identity (IMSI).

11. The radio network node of claim 9, wherein the downlink legacy resource is a Synchronization Channel (SCH), a Broadcast Channel (BCCH), or a Common Control Channel (CCCH), and wherein the downlink extended coverage resource is an Extended Coverage SCH (EC-SCH), an Extended Coverage BCCH (EC-BCCH), or an Extended Coverage CCCH (EC-CCCH).

12. The radio network node of claim 11, wherein the radio network node is configured to transmit the indication by further being configured to transmit the indication in one of: a System Information message using the BCCH and/or the EC-BCCH; a synchronization message using the SCH and/or the EC-SCH; and an access grant or paging message using the CCCH and/or the EC-CCCH.

13. A radio network node for load balancing in a wireless communications network, wherein the radio network node is configured to communicate with a wireless device supporting both normal coverage and extended coverage, wherein the radio network node and the wireless device are operating in the wireless communications network, and wherein the radio network node comprises a processor and memory, the memory being operatively coupled to the processor and containing program instructions for execution by the processor, whereby the radio network node is configured to:
determine an indication informing the wireless device of at least one of the following:
that the wireless device, when in normal coverage, is to monitor one of a downlink legacy resource and an extended coverage resource for information, and
that the wireless device, when in normal coverage, is to use one of an uplink legacy resource and an extended coverage resource when accessing the wireless communications network; and
transmit the indication to the wireless device;
the radio network node further being configured to:
determine a need for load balancing between a legacy resource and an extended coverage resource, wherein the legacy and the extended coverage resources are downlink legacy and extended coverage resources or uplink legacy and extended overage resources; and wherein the radio network node is configured to determine the indication by further being configured to:
determine the indication based on the need for load balancing.

14. The radio network node of claim 13, wherein the radio network node is configured to determine the need for load balancing between the legacy resource and the extended coverage resource, by further being configured to:
determine a load balancing between the legacy resource and the extended coverage resource based on one or more device identities.

15. The radio network node of claim 13, wherein the radio network node is configured to determine the need for load balancing between the legacy resource and the extended coverage resource, by further being configured to:
determine a load balancing between the legacy resource and the extended coverage resource based on a priority associated with the wireless device.

16. A radio network node for load balancing in a wireless communications network, wherein the radio network node is configured to communicate with a wireless device supporting both normal coverage and extended coverage, wherein the radio network node and the wireless device are operating in the wireless communications network, and wherein the radio network node comprises a processor and memory, the memory being operatively coupled to the processor and containing program instructions for execution by the processor, whereby the radio network node is configured to:
determine an indication informing the wireless device of at least one of the following:
that the wireless device, when in normal coverage, is to monitor one of a downlink legacy resource and an extended coverage resource for information, and
that the wireless device, when in normal coverage, is to use one of an uplink legacy resource and an extended coverage resource when accessing the wireless communications network; and
transmit the indication to the wireless device;
wherein the uplink legacy resource is a Common Control Channel (CCCH), and wherein the uplink extended coverage resource is an Extended Coverage CCCH (EC-CCCH).

17. A method performed by a wireless device for load balancing in a wireless communications network, wherein the wireless device supports both normal coverage and extended coverage, wherein the wireless device and a radio network node are operating in the wireless communications network, and wherein the method comprises:
receiving, from the radio network node, an indication informing the wireless device of at least one of the following: that the wireless device, when in normal coverage, is to monitor one of a downlink legacy resource and a downlink extended coverage resource for information, and that the wireless device, when in normal coverage, is to use one of an uplink legacy resource and an uplink extended coverage resource when accessing the wireless communications network, and,
when the wireless device is in normal coverage, performing at least one of the following, in accordance with the indication: monitoring the one of the downlink legacy and extended coverage resources for information, and accessing the wireless communications network using the one of the uplink legacy and extended coverage resources.

18. The method of claim 17, wherein the downlink legacy resource is a Synchronization Channel (SCH), a Broadcast Channel (BCCH), or a Common Control Channel (CCCH), and wherein the downlink extended coverage resource is an Extended Coverage SCH (EC-SCH), an Extended Coverage BCCH (EC-BCCH), or an Extended Coverage CCCH (EC-CCCH).

19. The method of claim 18, wherein the receiving of the indication comprises receiving the indication in one of: a System Information message on the BCCH and/or the EC-BCCH; a synchronization message on the SCH and/or the EC-SCH; and an access grant or paging message on the CCCH and/or the EC-CCCH.

20. The method of claim 17, wherein the uplink legacy resource is a Common Control Channel (CCCH), and wherein the uplink extended coverage resource is an Extended Coverage CCCH (EC-CCCH).

21. The method of claim 17, wherein the indication is based on one or more device identities, and wherein the monitoring of the one of the downlink legacy and extended coverage resources for information further comprises:
monitoring the one of the downlink legacy and extended coverage resources when a device identity of the wireless device corresponds to the one or more device identities, and/or
wherein the accessing of the wireless communications network using the one of the uplink legacy and extended coverage resources further comprises:
accessing the communications network using the one of the uplink legacy and extended coverage resources when the identity of the wireless device corresponds to the one or more device identities.

22. The method of claim 21, wherein the one or more device identities are given by one or more of a Packet Temporary Mobile Subscriber Identity (P-TMSI), a Temporary Logical Link Identifier (TLLI), or an International Mobile Subscriber Identity (IMSI).

23. A wireless device for load balancing in a wireless communications network, wherein the wireless device supports both normal coverage and extended coverage, wherein the wireless device and a radio network node are operating in the wireless communications network, and wherein the wireless device comprises a processor and memory, the memory being operatively coupled to the processor and containing program instructions for execution by the processor, whereby the wireless device is configured to:
 receive, from the radio network node, an indication informing the wireless device of at least one of the following: that the wireless device, when in normal coverage, is to monitor one of a downlink legacy resource and a downlink extended coverage resource for information, and that the wireless device, when in normal coverage, is to use one of an uplink legacy resource and an uplink extended coverage resource when accessing the wireless communications network, and,
 when the wireless device is in normal coverage, perform at least one of the following, in accordance with the indication: monitor the one of the downlink legacy and extended coverage resources for information and/or access the wireless communications network using the one of the uplink legacy and extended coverage resources.

24. The wireless device of claim 23, wherein the downlink legacy resource is a Synchronization Channel (SCH), a Broadcast Channel (BCCH), or a Common Control Channel (CCCH), and wherein the downlink extended coverage resource is an Extended Coverage SCH (EC-SCH), an Extended Coverage BCCH (EC-BCCH), or an Extended Coverage CCCH (EC-CCCH).

25. The wireless device of claim 24, wherein the wireless device is configured to receive the indication by further being configured to receive the indication in one of: a System Information message on the BCCH and/or the EC-BCCH; a synchronization message on the SCH and/or the EC-SCH; and an access grant or paging message on the CCCH and/or the EC-CCCH.

26. The wireless device of claim 25, wherein the indication is based on one or more device identities, and wherein the wireless device is configured to monitor the one of the downlink legacy and extended coverage resources for information by further being configured to:
 monitor the one of the downlink legacy and extended coverage resources when a device identity of the wireless device corresponds to the one or more device identities, and/or
 wherein the wireless device is configured to access the wireless communications network using the one of the uplink legacy and extended coverage resources further by further being configured to:
 access the communications network using the one of the uplink legacy and extended coverage resources when the identity of the wireless device corresponds to the one or more device identities.

27. The wireless device of claim 26, wherein the one or more device identities are given by one or more of a Packet Temporary Mobile Subscriber Identity (P-TMSI), a Temporary Logical Link Identifier (TLLI), or an International Mobile Subscriber Identity (IMSI).

28. The wireless device of claim 23, wherein the uplink legacy resource is a Common Control Channel (CCCH), and wherein the uplink extended coverage resource is an Extended Coverage CCCH (EC-CCCH).

29. A method performed by a network node for load balancing in a wireless communications network, wherein the network node is configured to communicate with a radio network node that is configured to communicate with a wireless device supporting both normal coverage and extended coverage, wherein the network node, the radio network node and the wireless device are operating in the wireless communications network, and wherein the method comprises:
 determining an indication informing the wireless device of at least one of the following:
  that the wireless device, when in normal coverage, is to monitor one of a downlink legacy and an extended coverage resources for information, and that the wireless device, when in normal coverage, is to use one of an uplink legacy and an extended coverage resource when accessing the wireless communications network; and
 transmitting the indication to the radio network node;
the method further comprising:
 determining a need for load balancing between a legacy resource and an extended coverage resource, wherein the legacy and the extended coverage resources are downlink legacy and extended coverage resources or uplink legacy and extended overage resources; and
 wherein the determining of the indication comprises:
 determining the indication based on the need for load balancing.

30. The method of claim 29, wherein the determining of the need for load balancing between the legacy resource and the extended coverage resource, further comprises:
 determining a load balancing between the legacy resource and the extended coverage resource.

31. The method of claim 30, wherein the determining of the load balancing between the legacy resource and the extended coverage resource further comprises:
 determining the load balancing based on a priority associated with the wireless device.

32. The method of claim 30, further comprising:
 allocating a device identity for the wireless device when determining the load balancing.

33. The method of claim 32, wherein the device identity is given by a Packet Temporary Mobile Subscriber Identity (P-TMSI); a Temporary Logical Link Identifier (TLLI); or an International Mobile Subscriber Identity (IMSI).

34. A method performed by a network node for load balancing in a wireless communications network, wherein the network node is configured to communicate with a radio network node that is configured to communicate with a wireless device supporting both normal coverage and extended coverage, wherein the network node, the radio network node and the wireless device are operating in the wireless communications network, and wherein the method comprises:
 determining an indication informing the wireless device of at least one of the following:
  that the wireless device, when in normal coverage, is to monitor one of a downlink legacy and an extended coverage resources for information, and that the wireless device, when in normal coverage, is to use one of an uplink legacy and an extended coverage resource when accessing the wireless communications network; and transmitting the indication to the radio network node;
wherein the determining of the indication further comprises:
  determining the indication based on one or more device identities.

35. A method performed by a network node for load balancing in a wireless communications network, wherein the network node is configured to communicate with a radio network node that is configured to communicate with a wireless device supporting both normal coverage and extended coverage, wherein the network node, the radio network node and the wireless device are operating in the wireless communications network, and wherein the method comprises:
  determining an indication informing the wireless device of at least one of the following:
    that the wireless device, when in normal coverage, is to monitor one of a downlink legacy and an extended coverage resources for information, and that the wireless device, when in normal coverage, is to use one of an uplink legacy and an extended coverage resource when accessing the wireless communications network; and
  transmitting the indication to the radio network node;
wherein the downlink legacy resource is a Synchronization Channel (SCH), a Broadcast Channel (BCCH), or a Common Control Channel (CCCH), and wherein the downlink extended coverage resource is an Extended Coverage SCH (EC-SCH), an Extended Coverage BCCH (EC-BCCH), or an Extended Coverage CCCH (EC-CCCH).

36. A method performed by a network node for load balancing in a wireless communications network, wherein the network node is configured to communicate with a radio network node that is configured to communicate with a wireless device supporting both normal coverage and extended coverage, wherein the network node, the radio network node and the wireless device are operating in the wireless communications network, and wherein the method comprises:
  determining an indication informing the wireless device of at least one of the following:
    that the wireless device, when in normal coverage, is to monitor one of a downlink legacy and an extended coverage resources for information, and that the wireless device, when in normal coverage, is to use one of an uplink legacy and an extended coverage resource when accessing the wireless communications network; and
  transmitting the indication to the radio network node;
wherein the uplink legacy resource is a Common Control Channel (CCCH), and wherein the uplink extended coverage resource is an Extended Coverage CCCH (EC-CCCH).

37. A network node for load balancing in a wireless communications network, wherein the network node is configured to communicate with a radio network node that is configured to communicate with a wireless device supporting both normal coverage and extended coverage, wherein the network node, the radio network node and the wireless device are operating in the wireless communications network, and wherein the network node comprises a processor and memory, the memory being operatively coupled to the processor and containing program instructions for execution by the processor, whereby the radio network node is configured to:
  determine an indication informing the wireless device of at least one of the following:
    that the wireless device, when in normal coverage, is to monitor one of a downlink legacy and an extended coverage resources for information, and that the wireless device, when in normal coverage, is to use one of an uplink legacy and an extended coverage resource when accessing the wireless communications network; and
  transmit the indication to the radio network node;
the network node further being configured to:
  determine a need for load balancing between a legacy resource and an extended coverage resource, wherein the legacy and the extended coverage resources are downlink legacy and extended coverage resources or uplink legacy and extended overage resources; and
  wherein the network node is configured to determine the indication by further being configured to:
  determine the indication based on the need for load balancing.

38. The network node of claim 37, wherein the network node is configured to determine the need for load balancing between the legacy resource and the extended coverage resource, by further being configured to:
  determine the load balancing between the legacy resource and the extended coverage resource.

39. The network node of claim 38, wherein network node is configured to determine the load balancing between the legacy resource and the extended coverage resource by further being configured to:
  determine the load balancing based on a priority associated with the wireless device.

40. The network node of claim 38, further being configured to:
  allocate a device identity for the wireless device when determining the load balancing.

41. The network node of claim 40, wherein the device identity is given by a Packet Temporary Mobile Subscriber Identity (P-TMSI); a Temporary Logical Link Identifier (TLLI); or an International Mobile Subscriber Identity (IMSI).

42. A network node for load balancing in a wireless communications network, wherein the network node is configured to communicate with a radio network node that is configured to communicate with a wireless device supporting both normal coverage and extended coverage, wherein the network node, the radio network node and the wireless device are operating in the wireless communications network, and wherein the network node comprises a processor and memory, the memory being operatively coupled to the processor and containing program instructions for execution by the processor, whereby the radio network node is configured to:
  determine an indication informing the wireless device of at least one of the following:
    that the wireless device, when in normal coverage, is to monitor one of a downlink legacy and an extended coverage resources for information, and that the wireless device, when in normal coverage, is to use one of an uplink legacy and an extended coverage resource when accessing the wireless communications network; and
  transmit the indication to the radio network node;
the network node further being configured to:
  determine the indication based on one or more device identities.

43. A network node for load balancing in a wireless communications network, wherein the network node is configured to communicate with a radio network node that is configured to communicate with a wireless device supporting both normal coverage and extended coverage, wherein the network node, the radio network node and the wireless device are operating in the wireless communications network, and wherein the network node comprises a processor and memory, the memory being operatively coupled to the processor and containing program instructions for execution by the processor, whereby the radio network node is configured to:
  determine an indication informing the wireless device of at least one of the following:
    that the wireless device, when in normal coverage, is to monitor one of a downlink legacy and an extended coverage resources for information, and that the wireless device, when in normal coverage, is to use one of an uplink legacy and an extended coverage resource when accessing the wireless communications network; and
  transmit the indication to the radio network node;
wherein the downlink legacy resource is a Synchronization Channel (SCH), a Broadcast Channel (BCCH), or a Common Control Channel (CCCH), and wherein the downlink extended coverage resource is an Extended Coverage SCH (EC-SCH), an Extended Coverage BCCH (EC-BCCH), or an Extended Coverage CCCH (EC-CCCH).

44. A network node for load balancing in a wireless communications network, wherein the network node is configured to communicate with a radio network node that is configured to communicate with a wireless device supporting both normal coverage and extended coverage, wherein the network node, the radio network node and the wireless device are operating in the wireless communications network, and wherein the network node comprises a processor and memory, the memory being operatively coupled to the processor and containing program instructions for execution by the processor, whereby the radio network node is configured to:
  determine an indication informing the wireless device of at least one of the following:
    that the wireless device, when in normal coverage, is to monitor one of a downlink legacy and an extended coverage resources for information, and that the wireless device, when in normal coverage, is to use one of an uplink legacy and an extended coverage resource when accessing the wireless communications network; and
  transmit the indication to the radio network node;
wherein the uplink legacy resource is a Common Control Channel (CCCH), and wherein the uplink extended coverage resource is an Extended Coverage CCCH (EC-CCCH).

* * * * *